(12) United States Patent
Spears et al.

(10) Patent No.: US 7,646,514 B2
(45) Date of Patent: Jan. 12, 2010

(54) SCANNING METHOD AND SYSTEM

(75) Inventors: Kurt E. Spears, Fort Collins, CO (US);
David D. Bohn, Fort Collins, CO (US);
John G. Thelen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1040 days.

(21) Appl. No.: 10/634,973

(22) Filed: Aug. 5, 2003

(65) Prior Publication Data

US 2005/0052713 A1    Mar. 10, 2005

(51) Int. Cl.
*H04N 1/04* (2006.01)
(52) U.S. Cl. .................. 358/474; 358/497; 358/493; 358/487
(58) Field of Classification Search .............. 358/474, 358/497, 493, 487, 506; 399/362, 379, 380
See application file for complete search history.

(56) References Cited

U.S. PATENT DOCUMENTS

| | | | |
|---|---|---|---|
| 3,832,484 A * | 8/1974 | Tanaka | 358/448 |
| 5,038,222 A | 8/1991 | Saito | |
| 5,126,855 A | 6/1992 | Saito | |
| 5,280,545 A | 1/1994 | Masuda | |
| 6,069,715 A | 5/2000 | Wang | |
| 6,198,547 B1 | 3/2001 | Matsuda | |
| 6,355,938 B1 * | 3/2002 | Cantu et al. | 250/584 |
| 6,439,784 B1 | 8/2002 | Keyes et al. | |
| 6,586,750 B2 * | 7/2003 | Montagu et al. | 250/458.1 |
| 7,067,835 B2 * | 6/2006 | Kerr et al. | 250/584 |
| 2003/0063332 A1 | 4/2003 | Sato | |
| 2004/0169894 A1 * | 9/2004 | Schroath et al. | 358/474 |

FOREIGN PATENT DOCUMENTS

| | | |
|---|---|---|
| DE | 3713009 A1 | 10/1988 |
| DE | 19807944 | 8/1999 |
| EP | 0580148 A3 | 1/1994 |
| JP | 07254972 A | 10/1995 |
| JP | 9-224105 | 8/1997 |

OTHER PUBLICATIONS

International Search Report dated Dec. 7, 2004.

* cited by examiner

*Primary Examiner*—Houshang Safaipour

(57) ABSTRACT

In accordance with an embodiment of the present invention, an image capture device comprises a first scanning module operable to scan a first side of an object and a second scanning module operable to scan a second side of the object, the first and second scanning modules translatable along their respective displacement paths.

31 Claims, 4 Drawing Sheets

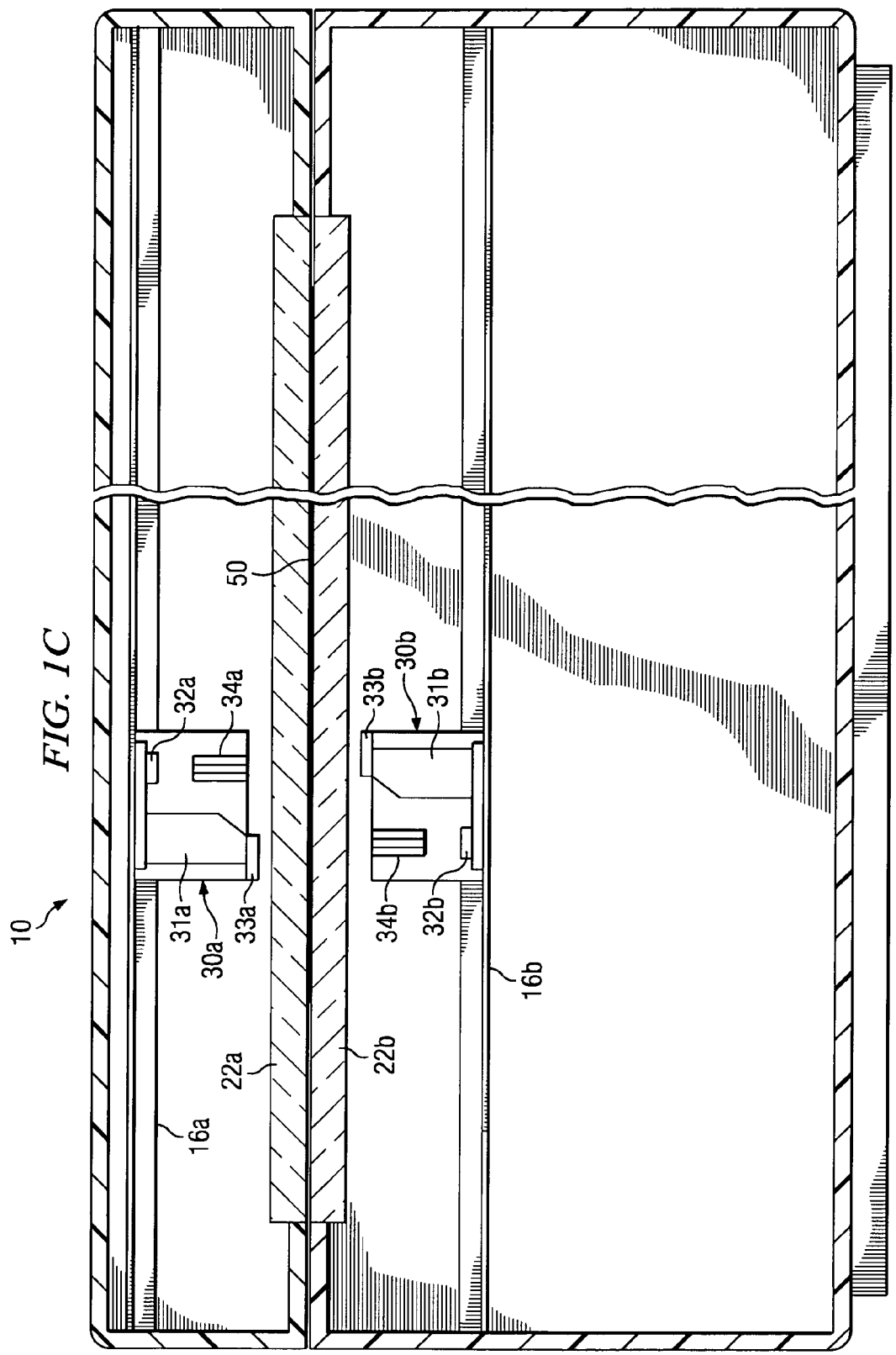

SCANNING METHOD AND SYSTEM

TECHNICAL FIELD OF THE INVENTION

The present invention relates generally to the field of image capture devices, and more particularly, to an image capture device with multiple scanning modules.

BACKGROUND OF THE INVENTION

Today's electronic society enjoys a variety of technologies that assist consumers and businesses in communicating a variety of data, such as textual, graphic, and image information, between devices such as computers, personal digital assistants (PDAs), facsimile machines, and others. One of these technologies includes the ability to scan information from an object, such as a paper document or another hard copy media. This information may be directly stored, or further processed (e.g., through optical character recognition (OCR) technology to create a document that may be word-processed using an application such as WORD from Microsoft Corporation).

Some systems are limited to scanning a single side of a paper document or other hard copy media. Some of these systems may provide the ability to scan a source such as film or transparency. These systems employ specific controls in order to compensate for and to adequately position the media being scanned so that the information within may be accurately captured by the scanner. Such systems include a single photosensitive device that provides either transparency scanning or face-down scanning of a hard copy media. These systems require a consumer to manually intervene in the scanning process to scan both sides of a paper or other media. For example, the consumer initiates a first scan with a first side of the paper facing a platen of the scanner. The consumer then has to flip the paper over such that a second side of the paper faces the platen for scanning. Moreover, where consumers desire to scan transparent media, they must purchase and use a transparent media adapter and also manually indicate to the scanner that a transparent medium is to be scanned.

SUMMARY OF THE INVENTION

In accordance with an embodiment of the present invention, an image capture device comprises a first scanning module operable to scan a first side of an object and a second scanning module operable to scan a second side of the object, the first and second scanning modules translatable along their respective displacement paths.

In accordance with another embodiment of the present invention, a method for scanning an object by an image capture device comprises illuminating a first portion of the object by a first scanning module of said image capture device, capturing light passing through the first portion by a second scanning module of said image capture device, and moving the first and second scanning modules along their respective displacement paths to illuminate a second portion of the object and to capture light passing through the second portion.

BRIEF DESCRIPTION OF THE DRAWINGS

For a more complete understanding of the present invention, the objects and advantages thereof, reference is now made to the following descriptions taken in connection with the accompanying drawings in which:

FIG. 1C is a sectional view of the image capture device of FIG. 1A taken along section 1C-1C;

DETAILED DESCRIPTION OF THE DRAWINGS

The preferred embodiment of the present invention and its advantages are best understood by referring to FIGS. 1A through 3B of the drawings, like numerals being used for like and corresponding parts of the various drawings.

The present invention will be described herein with reference to an image capture device, such as a scanner. The teachings of the present invention may be used with respect to other types of image capture devices, such as photocopiers, facsimile machines, printers, and/or the like.

Figure 1A:
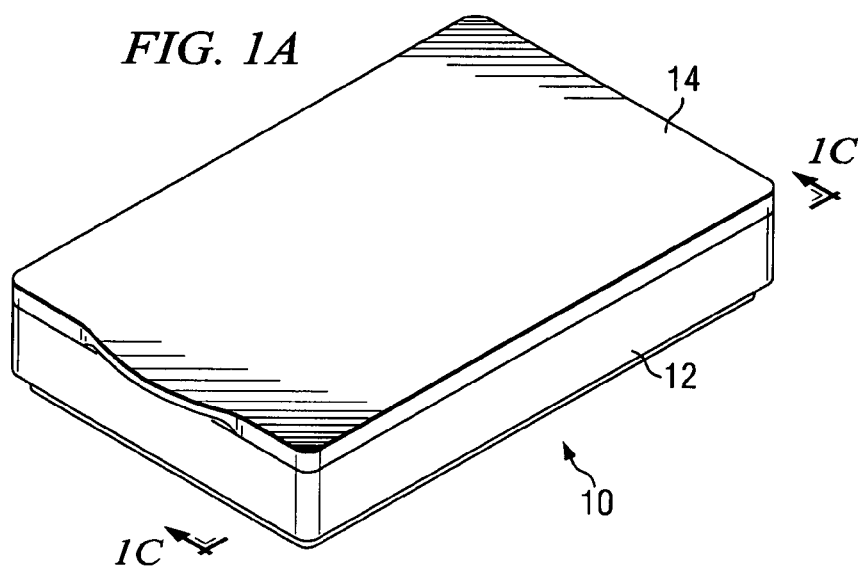
FIGS. 1A and 1B are perspective views of an exemplary image capture device which may use embodiments of the present invention to advantage.
Figure 1B:
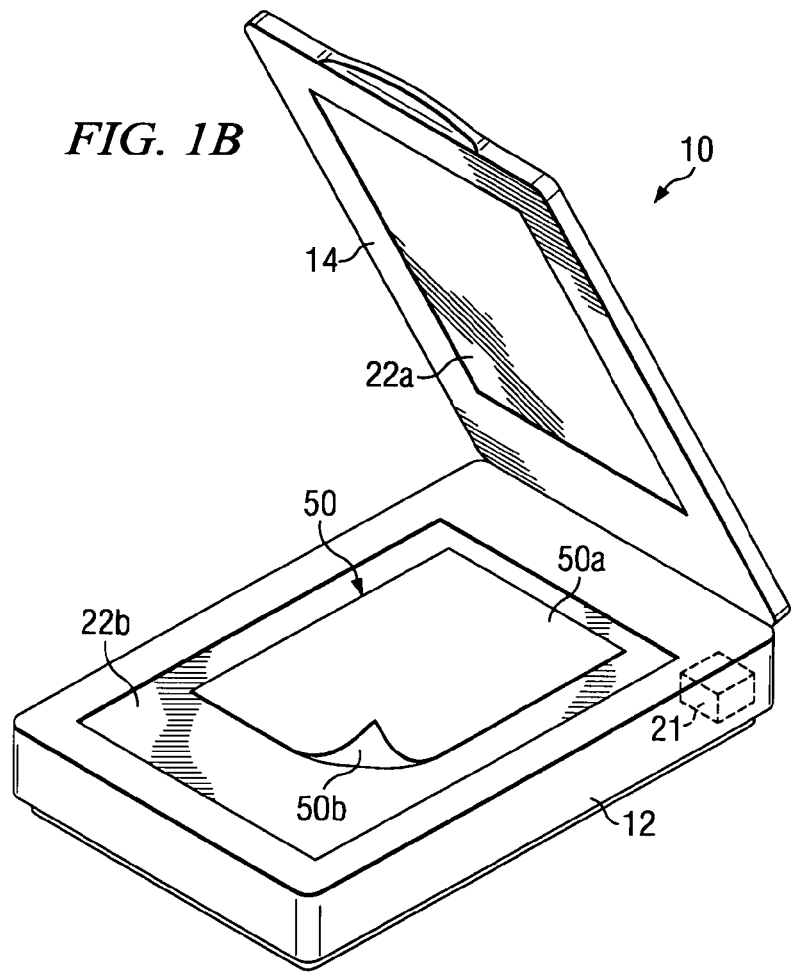

FIGS. 1A and 1B are perspective views of an exemplary image capture device 10, in the form of a scanner, which may use embodiments of the present invention to advantage and FIG. 1C is a sectional view of the image capture device 10. If desired, image capture device 10 may instead be part of a multi-function device, a copier, a facsimile machine, a digital sender or another machine that generates a digital image for storage, transmission and/or further processing.

Device 10 comprises a housing 12 and a lid 14 coupled to housing 12. Device 10 comprises two platens 22a and 22b generally parallel to each other. Platen 22a is disposed on a bottom side of lid 14 facing housing 12 and platen 22b is disposed on a top side of housing 12 facing lid 14. Device 10 comprises a plurality of scanning modules. In the exemplary embodiment of FIG. 1C, device 10 comprises a first scanning module 30a and a second scanning module 30b.

Scanning modules 30a and 30b are mounted on separate support rails 16a and 16b, respectively. Support rail 16a is disposed in lid 14 and is generally parallel to platen 22a such that a displacement path of first scanning module 30a is generally parallel to platen 22a. Support rail 16b is disposed in housing 12 and is generally parallel to platen 22b such that a displacement path of second scanning module 30b is generally parallel to platen 22b. Each of the scanning modules 30a and 30b may be moved and operated independent of the other.

First scanning module 30a preferably comprises a photosensitive device 32a. Photosensitive device 32a preferably includes at least one generally linearly-arranged sensor or chip having a plurality of individual sensor elements or pixels. Photosensitive device 32a preferably comprises Contact Image Sensor (CIS) optical sensors. Embodiments of the present invention contemplate the use of any suitable image sensors now known or developed in the future such as, but not limited to, charge-coupled device (CCD) optical sensors, complementary metal-oxide semiconductor (CMOS) optical sensors and others. First scanning module 30a also preferably comprises a light source 31a. The type of light source used may be based on a desired scanning speed. Light source 31a preferably comprises a light-emitting diode (LED). In another embodiment, light source 31a may comprise a cold cathode fluorescent light (CCFL). Embodiments of the present invention contemplate the use of other light sources now known or developed in the future. A lens 34a, for example a gradient index lens array, is preferably disposed between photosensitive device 32a and platen 22a such that a longitudinal axis of lens 34a intersects photosensitive device 32a. First scanning module 30a also comprises a background strip 33a, for example a white strip. Preferably, the position of background strip 33a is such that background strip 33a is disposed in between light source 31a and platen 22a. Background strip 33a provides a uniform background for scanning using second scanning module 30b.

Second scanning module 30b preferably comprises a photosensitive device 32b. Photosensitive device 32b preferably includes at least one generally linearly-arranged sensor or chip having a plurality of individual sensor elements or pixels. Photosensitive device 32b preferably comprises CIS optical sensors. Embodiments of the present invention contemplate the use of any suitable image sensors now known or developed in the future such as, but not limited to, CCD optical sensors, CMOS optical sensors and others. Second scanning module 30b also preferably comprises a light source 31b. The type of light source used may be based on a desired scanning speed. Light source 31b preferably comprises an LED. In another embodiment, light source 31b may comprise a CCFL. Embodiments of the present invention contemplate the use of other light sources now known or developed in the future. A lens 34b, for example a gradient index lens array, is preferably disposed between photosensitive device 32b and platen 22b such that a longitudinal axis of lens 34b intersects photosensitive device 32b. Second scanning module 30b also comprises a background strip 33b, for example a white strip. Background strip 33b provides a uniform background for scanning using first scanning module 30a. Preferably, the position of background strip 33b is such that background strip 33b is disposed in between light source 31b and platen 22b. If desired, the relative positions of the photosensitive devices, light sources and background strips within their respective scanning modules may be interchanged. If desired, scanning modules 30a and 30b may be calibrated before scanning, using one of a number of methods.

Light sources 31a and 31b may each be operated in a coordinated manner with photosensitive devices 32a or 32b, depending on the mode of operation of device 10. Depending on the mode of operation, scanning modules 30a and 30b may be synchronously translated together along their respective rails, or they may be displaced such that their position along their respective rails is not the same at any given time. If desired, during a particular scanning mode only one of the scanning modules may be in operation and moved along the rail, while the other is stationary. The operating modes are described in more detail below.

An object 50, such as a document, a photograph, a negative, a transparency, and/or the like, having sides 50a and 50b is placed against platen 22b for scanning such that it is sandwiched between platens 22a and 22b. In this position, when lid 14 is closed, object 50 is in between platens 22a and 22b. Object 50 may be opaque or transparent. Each of the photosensitive devices 32a and 32b is operable to capture data such as, but not limited to, text, graphics, illustrations, and images, from at least one of the sides 50a and 50b of object 50 disposed between platens 22a and 22b. The side from which a particular photosensitive device captures data depends on the mode of operation of device 10 as discussed further hereinbelow.

A controller 21 directs first and second scanning modules 30a and 30b to scan information from object 50. In the illustrated embodiment, controller 21 is located in housing 12. If desired, controller 21 may be located elsewhere depending on device 10. Controller 21 may be coupled, wirelessly or otherwise, and directly or indirectly, to light sources 31a, 31b and photosensitive devices 32a, 32b. In a particular embodiment, controller 21 is used to control photosensitive device 32a, light source 31a, photosensitive device 32b and light source 31b. Controller 21 may also direct the movement of scanning modules 30a and 30b along rails 16a and 16b respectively. In other embodiments, more than one controller 21 is used to control operation of scanning modules 30a and 30b. In another embodiment, controller 21 is operable to control operation of one of the photosensitive devices 32a and 32b and/or one of the light sources 31a and 31b, depending on the application.

In operation, system 10 images first side 50a of object 50, second side 50b of object 50, or both sides. Device 10 is capable of operating in a plurality of modes, for example, a face-up mode, a face-down mode, a duplex mode, and a transparency mode. For illustrative purposes, this description will use the term "face-up mode" to describe scanning of side 50a of object 50, the term "face-down mode" to describe scanning of side 50b of object 50, and the term "duplex mode" to describe scanning of both sides 50a and 50b of object 50. This description will utilize the term "transparency mode" to describe scanning of transparent object 50.

In each of these modes of operation, photosensitive device 32a or 32b operates in conjunction with light source 31a or 31b to scan a selected side of object 50. For example, face-up mode scanning may be performed by photosensitive device 32a and light source 31a; face-down mode scanning may be performed by photosensitive device 32b and light source 31b. Duplex mode scanning is performed by photosensitive device 32a and light source 31a scanning side 50a of object 50, and photosensitive device 32b and light source 31b scanning side 50b of object 50. Transparency mode scanning may be performed by photosensitive device 32a and light source 31b, or by photosensitive device 32b and light source 31a. Transparency mode scanning employs illumination of one of the sides 50a or 50b and scanning of the other side 50b or 50a, respectively. That is, in the transparency mode, object 50 is "backlit".

Figure 2:
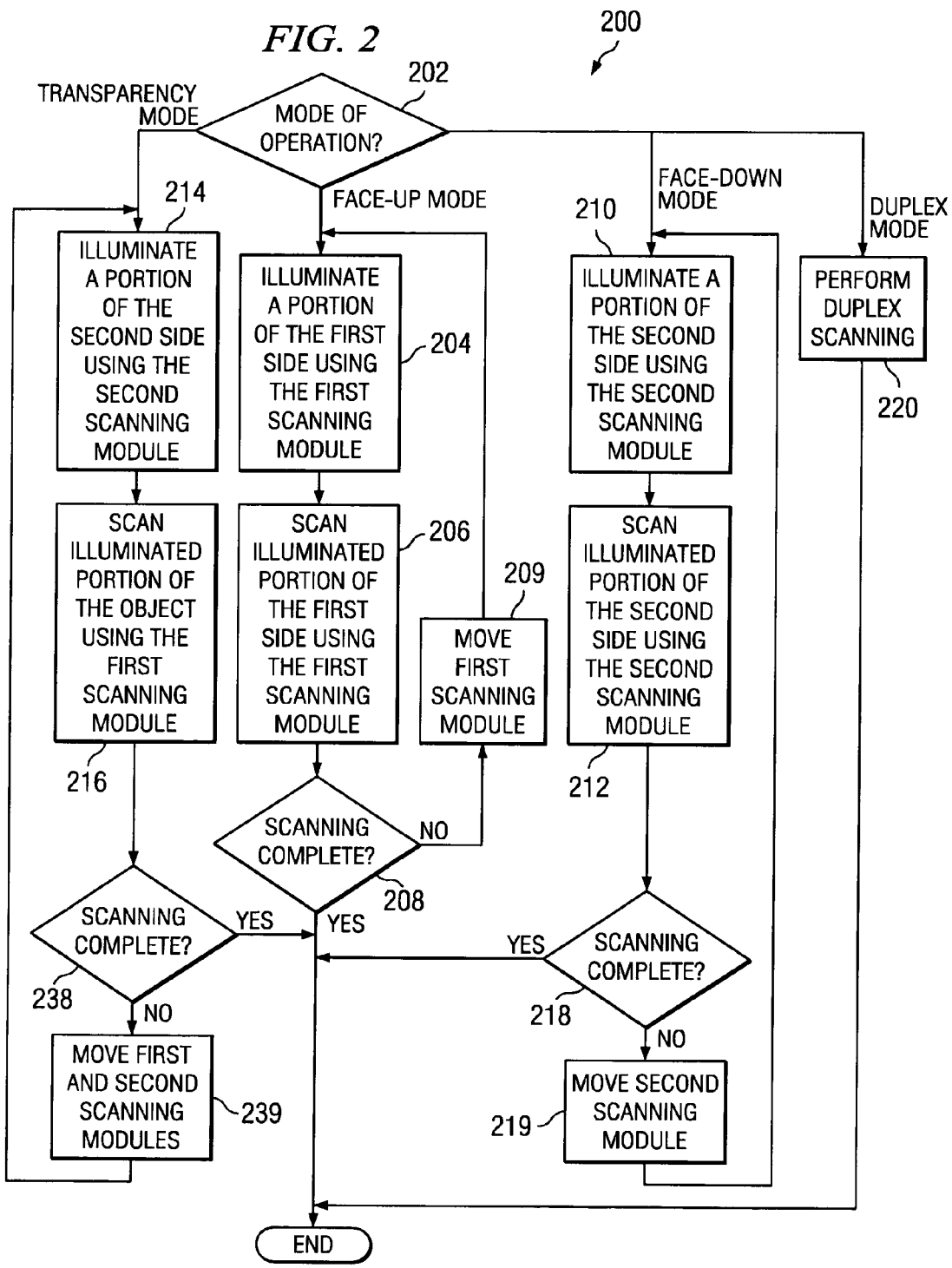
FIG. 2 is a flowchart of a method for scanning in accordance with an embodiment of the present invention.

FIG. 2 is a flowchart of a method 200 for scanning in accordance with an embodiment of the present invention. In method 200 data is captured by operating light sources 31a and/or 31b in conjunction with photosensitive devices 32a and/or 32b depending on the desired operating mode.

In block 202, an operating mode is selected. The operating mode may be selected by the user by entering the selection on a control panel associated with device 10. Alternatively, device 10 may be equipped to automatically select the desired operating mode by detecting, for example after or during a preview scan, whether the object is a transparent medium and whether the object has been placed with the content face-up or face-down.

If the face-up mode is selected, then first scanning module 30a is used to scan side 50a of object 50 to generate a digital image of side 50a. In block 204, at least a portion of side 50a is illuminated by light source 31a. In block 206, while a portion of side 50a is illuminated, photosensitive device 32a is used to capture light reflected from the illuminated portion of side 50a of object 50. The captured light is converted into pixel data values. The pixel data values are used to generate at least a portion of the digital image of side 50a. In block 208, a determination is made as to whether scanning is complete. If scanning is not complete, then at block 209 first scanning module 30a is moved along support rail 16a in a direction generally parallel to platen 22a and the process starting at block 204 is repeated to scan a portion of side 50a of object 50 adjacent to the portion just scanned. If scanning is complete, then the digital image may be stored or processed. For example, the digital image may be printed or displayed. If desired, the printing or displaying of portions of the digital image may simultaneously occur with the scanning of object 50.

If in block 202, the face-down mode is selected, then second scanning module 30b is used to scan side 50b of object 50 to generate a digital image of side 50b. In block 210, at least a portion of side 50b is illuminated by light source 31b. In block 212, while a portion of side 50b is illuminated, photosensitive device 32b is used to capture light reflected from the illuminated portion of side 50b of object 50. The captured light is converted into pixel data values. The pixel data values are used to generate at least a portion of the digital image of side 50b. In block 218, a determination is made as to whether scanning is complete. If scanning is not complete, then at block 219 second scanning module 30b is moved along support rail 16b in a direction generally parallel to platen 22b and the process starting at block 210 is repeated to scan a portion of side 50b of object 50 adjacent to the portion just scanned. If scanning is complete, then the digital image may be stored or processed. For example, the digital image may be printed or displayed. If desired, the printing or displaying of portions of the digital image may simultaneously occur with the scanning of object 50.

If in block 202, the transparency mode is selected, then both first and second scanning modules 30a and 30b are used to scan a transparent object 50 in order to generate a digital image of object 50. In the illustrated embodiment, in block 214, at least a portion of side 50b of object 50 is illuminated by light source 31b of second scanning module 30b. In block 216, while a portion of side 50b of object 50 is illuminated, photosensitive device 32a of first scanning module 30a is used to capture light passing through object 50. Preferably, light source 31b and photosensitive device 32a are aligned with each other to facilitate capturing of light by photosensitive device 32a. The captured light is converted into pixel data values. The pixel data values are used to generate at least a portion of the digital image of object 50. In block 238, a determination is made as to whether scanning is complete. If scanning is not complete, then at block 239 both first and second scanning modules 30a and 30b are moved along their respective rails 16a and 16b, in a direction generally parallel to platens 22a and 22b, respectively, and the process starting at block 214 is repeated to scan a portion of object 50 adjacent to the portion just scanned. If scanning is complete, then the digital image may be stored or processed. For example, the digital image may be printed or displayed. If desired, the printing or displaying of portions of the digital image may simultaneously occur with the scanning of object 50.

In an alternative embodiment, if the transparency mode is selected, then at least a portion of side 50a of object 50 is illuminated by light source 31a of first scanning module 30a. While a portion of side 50a of object 50 is illuminated, photosensitive device 32b of second scanning module 30b is used to capture light passing through object 50. Preferably, light source 31a and photosensitive device 32b are aligned with each other to facilitate capturing of light by photosensitive device 32b. The captured light is converted into pixel data values. The pixel data values are used to generate at least a portion of the digital image of object 50. A determination is made as to whether scanning is complete. If scanning is not complete, then both first and second scanning modules 30a and 30b are moved along their respective rails 16a and 16b, in a direction generally parallel to platens 22a and 22b, respectively, and the process is repeated to scan a portion of object 50 adjacent to the portion just scanned. If scanning is complete, then the digital image may be stored or processed. For example, the digital image may be printed or displayed. If desired, the printing or displaying of portions of the digital image may simultaneously occur with the scanning of object 50.

In the transparency mode, both scanning modules are used. Furthermore, depending on the locations of the light source and the photosensitive devices within the scanning modules, one of the scanning modules may be further along its path on its rail than the other scanning module, such that the light source of one of the scanning modules is aligned with the photosensitive device of the other scanning module. In the example of FIG. 2, light source 31b of second scanning module 30b aligns with photosensitive device 32a of first scanning module 30a. In such an arrangement, light source 31a of first scanning module 30a may or may not align with photosensitive device 32b of second scanning module 30b depending on the size or design of scanning modules 30a and 30b.

If in block 202, the duplex mode is selected, then in block 220, duplex scanning is performed during which first scanning module 30a is used to scan side 50a of object 50 and second scanning module 30b is used to scan side 50b of object 50 to generate digital images of the two sides. A method for performing duplex scanning in accordance with alternative embodiments of the present invention is discussed herein with reference to the flowcharts of FIGS. 3A and 3B.

In method 220, the two sides of object 50 are sequentially scanned with side 50a being scanned before side 50b. If desired, side 50b may be scanned before side 50a.

In block 222, at least a portion of side 50a of object 50 is illuminated by light source 31a. In block 224, while a portion of side 50a is illuminated, photosensitive device 32a is used to capture light reflected from the illuminated portion of side 50a of object 50. The captured light is converted into pixel data values. The pixel data values are used to generate at least a portion of a digital image of side 50a. In block 240, a determination is made as to whether scanning of side 50a is complete. If scanning of side 50a is complete, then the process starting at block 226 may be executed. Otherwise, at block 241 first scanning module 30a is moved along support rail 16a in a direction generally parallel to platen 22a and the process starting at block 222 is repeated to scan a portion of side 50a of object 50 adjacent to the portion just scanned.

Once scanning of side 50a is complete, in block 226, at least a portion of side 50b of object 50 is illuminated by light source 31b. In block 228, while a portion of side 50b is illuminated, photosensitive device 32b is used to capture light reflected from the illuminated portion of side 50b of object 50. The captured light is converted into pixel data values. The pixel data values are used to generate at least a portion of the digital image of side 50b. In block 242, a determination is made as to whether scanning is complete. If scanning is not complete, then at block 243 second scanning module 30b is moved along support rail 16b in a direction generally parallel to platen 22b and the process starting at block 226 is repeated to scan a portion of side 50b of object 50 adjacent to the portion just scanned. If scanning is complete, then the digital images of side 50a and side 50b of object 50 may be processed. For example, one or more of the digital images may be printed or displayed. If desired, the printing or displaying of the digital images may occur simultaneously with the scanning of object 50. For example, data that has already been acquired may be printed or displayed while the remaining portion of the object is being scanned.

Figure 3A:
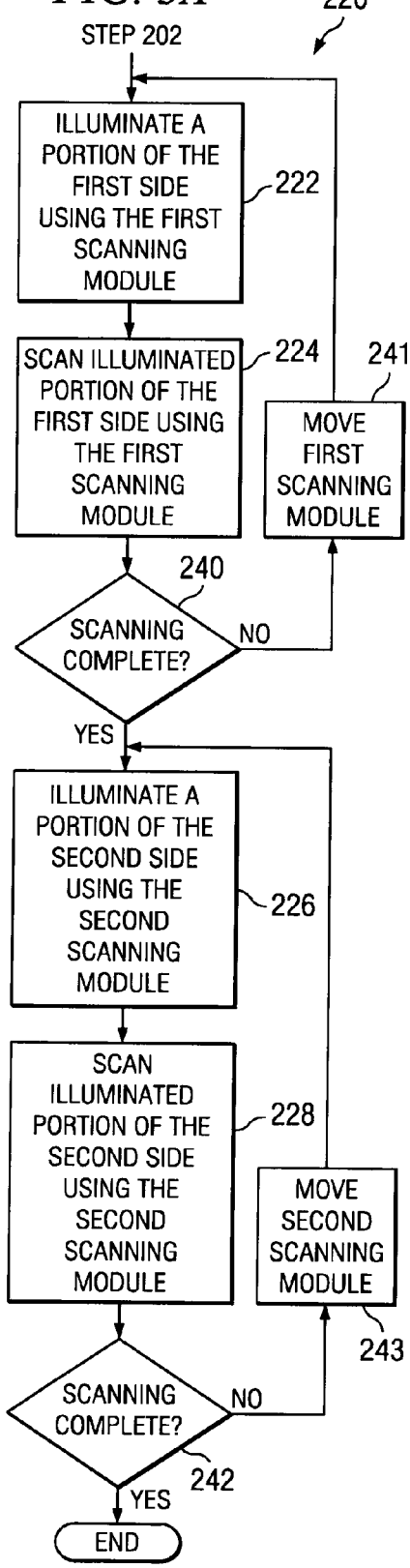
FIG. 3A is a flowchart of a method for scanning in a duplex mode in accordance with an embodiment of the present invention.
Figure 3B:
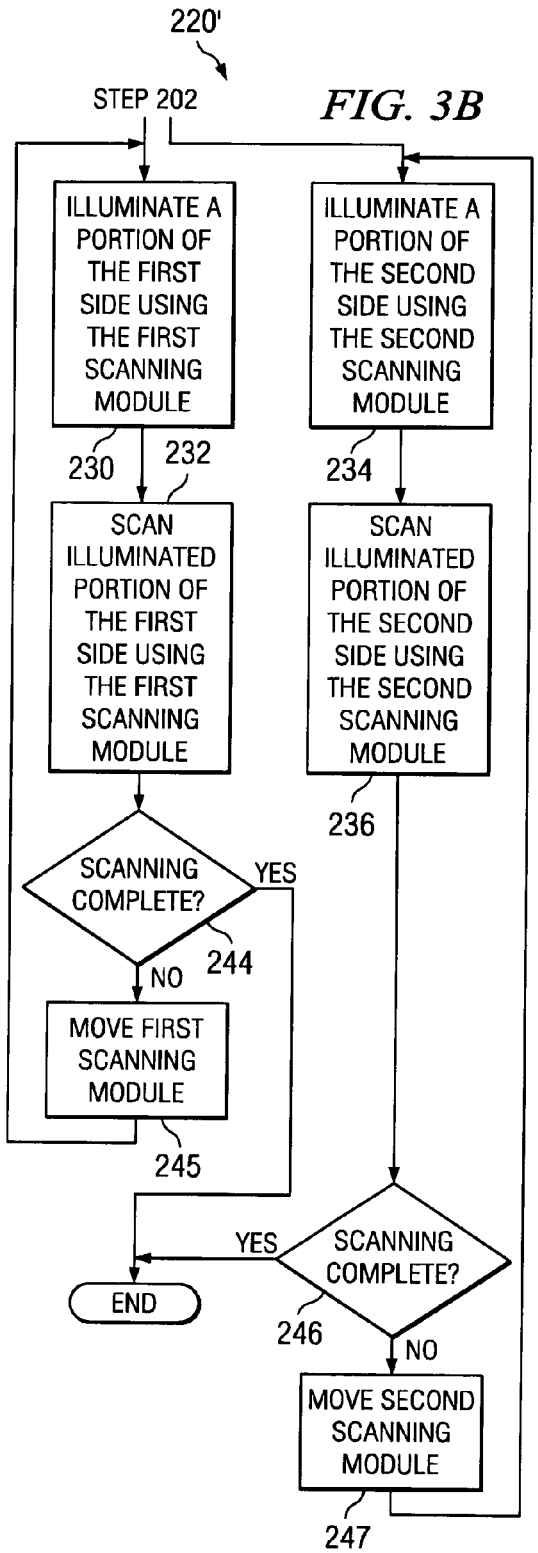
FIG. 3B is a flowchart of a method for scanning in a duplex mode in accordance with an alternative embodiment of the present invention.

FIG. 3B is a flowchart of a method 220' for scanning in a duplex mode in accordance with an alternative embodiment of the present invention. In method 220', the two sides are scanned simultaneously or substantially simultaneously. First and second scanning modules 30a and 30b are active simultaneously and scan sides 50a and 50b concurrently. Preferably, first scanning module 30a and second scanning module 30b are aligned with each other as they move along their respective support rails 16a and 16b to scan side 50a and side 50b, respectively. Background strips 33a and 33b, which are part of first and second scanning modules 30a and 30b, respectively, provide the desired uniform background for second and first scanning modules 30b and 30a, respectively, as the scanning modules are moved along their respective support rails.

In an alternative embodiment, if desired, instead of being aligned with each other, first and second scanning modules 30a and 30b may be offset from each other along their respective support rails. The advantage of having the scanning modules offset from each other is that the effect of "bleed-through" of light through medium 50 may be reduced or completely eliminated. In this embodiment, first and second scanning modules 30a and 30b may move together or independent of each other. For example, depending on the data being scanned, first scanning module 30a may be scanning the middle portion of side 50a while second scanning module 30b may be scanning the end region of side 50b.

In block 230, at least a portion of side 50a of object 50 is illuminated by light source 31a. In block 234, at least a portion of side 50b of object 50 is illuminated by light source 31b. In block 232, while a portion of side 50a is illuminated, photosensitive device 32a is used to capture light reflected from the illuminated portion of side 50a of object 50. The captured light is converted into pixel data values. The pixel data values are used to generate at least a portion of a digital image of side 50a. In block 236, while a portion of side 50b of object 50 is illuminated, photosensitive device 32b is used to capture light reflected from the illuminated portion of side 50b of object 50. The captured light is converted into pixel data values. The pixel data values are used to generate at least a portion of a digital image of side 50b.

In block 244, a determination is made as to whether scanning of side 50a is complete. If scanning of side 50a is not complete, then at block 245 first scanning module 30a is moved along support rail 16a in a direction generally parallel to platen 22a and the process starting at block 230 is repeated to scan a portion of side 50a of object 50 adjacent to the portion just scanned.

In block 246, a determination is made as to whether scanning of side 50b is complete. If scanning of side 50b is not complete, then at block 247 second scanning module 30b is moved along support rail 16b in a direction generally parallel to platen 22b and the process starting at block 234 is repeated to scan a portion of side 50b of object 50 adjacent to the portion just scanned.

If scanning is complete, then the digital images of side 50a and side 50b of object 50 may be processed. For example, one or more of the digital images may be printed or displayed. If desired, the printing or displaying of one or more digital images may occur simultaneously with the scanning of object 50. For example, data that has already been acquired may be printed or displayed while the remaining portion of the object is being scanned.

In some embodiment, device 10 may also be used for both color and non-color systems using various combinations of light sources and photosensitive devices. As one example, device 10 may utilize photosensitive devices 32a and 32b with on-chip color filters (red, green, blue) and white LED or white CCFL light sources 31a and 31b. Alternatively, device 10 may utilize photosensitive devices 32a and 32b with no color filters and use colored LED light sources 31a and 31b. For example, in a particular embodiment, a photosensitive device 32a or 32b with no color filter may be activated to scan while a red LED light source 31a or 31b is illuminated, and then turned off; activated to scan while a green LED light source 31a or 31b is illuminated; turned off, and activated to scan for a final time while a blue LED light source 31a or 31b is illuminated. This scanned data is used as three different color channels for each photosensitive device. This three-color channel configuration may require higher precision for controller 21. As another example, in a particular embodiment, a device 10 with a CIS photosensitive device 32a or 32b may be used with on-chip color separation in conjunction with a CCFL light source 31a or 31b, which is typically high in intensity and high in efficiency. In this way, system 10 may be used to capture grayscale data and/or color data.

If desired, in any of the modes of scanning, one of the scanning modules may be moved with or without moving other scanning modules. Embodiments of the present invention may be implemented in software, hardware, or a combination of both software and hardware. The software and/or hardware may reside on image capture device 10 or on a computer system associated with image capture device 10. If desired, part of the software and/or hardware may reside on image capture device 10 and part of the software and/or hardware may reside on the computer system.

If desired, the different functions discussed herein may be performed in any order and/or concurrently with each other. Furthermore, if desired, one or more of the above described functions may be optional or may be combined without departing from the scope of the present invention.

A technical advantage of an image capture device in accordance with an embodiment of the present invention is that it may operate in multiple modes. Another technical advantage of an exemplary embodiment of the present invention is that two sides of an object may be scanned without moving the object once it has been positioned on one of the platens. A further technical advantage of an exemplary embodiment of the present invention is that both transparent and opaque objects may be scanned without using a transparent media adapter.

What is claimed is:

1. An image capture device, comprising:
   a first scanning module operable to scan a first side of an object;
   a second scanning module operable to scan a second side of said object, said first and second scanning modules being independently translatable along their respective displacement paths and being offset from each other along their respective displacement paths during a duplex mode to reduce bleed-through of light through the object; and
   a housing, wherein one of said first and second scanning modules is disposed in said housing.

2. The image capture device of claim 1, further comprising a lid coupled to said housing, one of said first and second scanning modules being disposed in said lid.

3. The image capture device of claim 1, further comprising two platens operable to sandwich said object therebetween.

4. The image capture device of claim 2, said scanning module disposed in said lid being mounted on at least one support rail in said lid.

5. The image capture device of claim 1, said second scanning module disposed in said housing being mounted on at least one support rail in said housing.

6. The image capture device of claim 1, wherein said first scanning module comprises:
a light source operable to illuminate at least a portion of said first side; and
a photosensitive device operable to capture light reflected from said first side.

7. The image capture device of claim 1, wherein said first scanning module comprises a photosensitive device operable to capture light passing through said object.

8. The image capture device of claim 1, wherein said second scanning module comprises:
a light source operable to illuminate at least a portion of said second side; and
a photosensitive device operable to capture light reflected from said second side.

9. The image capture device of claim 1, wherein said second scanning module comprises a photosensitive device operable to capture light passing through said object.

10. The image capture device of claim 1, wherein said image capture device is operable to scan said object in a mode selected from the group consisting of a face-up mode, a face-down mode, the duplex mode and a transparency mode.

11. The image capture device of claim 1, wherein in a face-up mode said first scanning module scans said first side.

12. The image capture device of claim 1, wherein in a face-down mode said second scanning module scans said second side.

13. The image capture device of claim 1, wherein in the duplex mode said first scanning module scans said first side and said second scanning module scans said second side.

14. The image capture device of claim 1, wherein in a transparency mode, said first scanning module is operable to illuminate said object and said second scanning module is operable to capture light passing through said object.

15. The image capture device of claim 1, wherein in a transparency mode, said second scanning module is operable to illuminate said object and said first scanning module is operable to capture light passing through said object.

16. A method for scanning an object by an image capture device, comprising:
illuminating a first portion of said object by a first scanning module of said image capture device;
capturing light passing through said first portion by a second scanning module of said image capture device;
illuminating a second portion of said object by the second scanning module of said image capture device;
capturing light passing through said second portion by the first scanning module of said image capture device; and
moving said first and second scanning modules along their respective displacement paths to illuminate the first and second portions of said object.

17. The method of claim 16, wherein said moving comprises moving said first and second scanning modules such that a light source of said first scanning module and a photosensitive device of said second scanning module are aligned with each other.

18. The method of claim 16, wherein said illuminating comprises illuminating said first portion by a light source of said first scanning module.

19. The method of claim 16, wherein said capturing comprises capturing light passing through said first portion by a photosensitive device of said second scanning module.

20. A system, comprising:
an image capture device, and
application logic operatively associated with said image capture device and operable to:
cause a first scanning module of said image capture device to illuminate a first portion of said object;
cause a second scanning module of said image capture device to capture light passing through said first portion; and
cause movement of said first and second scanning modules along their respective displacement paths to illuminate a next portion of said object and to capture light passing through said next portion, wherein
said application logic is further operable to cause movement of said first and second scanning modules to be synchronously translated along their respective rails in a first mode of operation and to be translated in a second mode of operation such that positions of their respective rails are not same at any given time.

21. The system of claim 20, said application logic further operable to cause illumination of said first portion by a light source of said first scanning module.

22. The system of claim 20, said application logic further operable to cause said capturing of light passing through said first portion by a photosensitive device of said second scanning module.

23. An image capture device, comprising:
a first scanning module operable to illuminate a first side of said object; and
a second scanning module operable to illuminate a second side of said object said first and second scanning modules translatable along their respective displacement paths, wherein said first scanning module moves along a displacement path to illuminate the first side of said object and capture light transmitted through said object from said second scanning module, and said second scanning module moves along a displacement path to illuminate the second side of said object and capture light transmitted through said object from said first scanning module.

24. The image capture device of claim 23, wherein said first and second scanning modules are translatable such that a light source of said first scanning module and a photosensitive device of said second scanning module are aligned with each other.

25. The image capture device of claim 23, wherein said first scanning module comprises a light source operable to illuminate said first side.

26. The image capture device of claim 23, wherein said second scanning module comprises a photosensitive device operable to capture light passing through said first side.

27. The image capture device of claim 26, wherein said photosensitive device comprises at least one color filter.

28. The image capture device of claim 26, wherein said photosensitive device comprises a colored light source.

29. An image capture device, comprising:
a first scanning module operable to scan a first side of an object; and
a second scanning module operable to scan a second side of said object, said first and second scanning modules translatable along their respective displacement paths, wherein said first and second scanning modules are synchronously translated along their respective paths in a first mode and translated along their respective paths in a second mode such that positions of their respective paths are not same at any given time.

30. An image capture device, comprising:
a first scanning module operable to scan a first side of an object; and a second scanning module operable to scan a second side of said object, said first and second scanning modules translatable along their respective displacement paths, wherein said first and second scanning modules are offset from each other along their respective displacement paths to reduce bleed-through of light through the object.

31. An image capture device, comprising:

a first scanning module operable to scan a first side of an object; and a second scanning module operable to scan a second side of said object, said first and second scanning modules translatable along their respective displacement paths, wherein in a transparency mode, and one of said first and second scanning modules is farther along its displacement path than another of said first and second scanning modules such that a light source of the first scanning module is a aligned with a photosensitive device of the second scanning module.

* * * * *

UNITED STATES PATENT AND TRADEMARK OFFICE
CERTIFICATE OF CORRECTION

| | | |
|---|---|---|
| PATENT NO. | : 7,646,514 B2 | Page 1 of 1 |
| APPLICATION NO. | : 10/634973 | |
| DATED | : January 12, 2010 | |
| INVENTOR(S) | : Kurt E. Spears et al. | |

It is certified that error appears in the above-identified patent and that said Letters Patent is hereby corrected as shown below:

In column 10, line 29, in Claim 23, delete "object" and insert -- object, --, therefor.

In column 12, line 8, in Claim 31, after "is" delete "a".

Signed and Sealed this

Twenty-ninth Day of June, 2010

David J. Kappos
*Director of the United States Patent and Trademark Office*